United States Patent
Kao

(10) Patent No.: US 10,524,085 B2
(45) Date of Patent: Dec. 31, 2019

(54) PROXIMITY-BASED ITEM DATA COMMUNICATION

(71) Applicant: AT&T INTELLECTUAL PROPERTY I, L.P., Atlanta, GA (US)

(72) Inventor: Frank Kao, Palo Alto, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/427,507

(22) Filed: May 31, 2019

(65) Prior Publication Data

US 2019/0289422 A1    Sep. 19, 2019

Related U.S. Application Data

(63) Continuation of application No. 16/250,178, filed on Jan. 17, 2019, now Pat. No. 10,362,439, which is a
(Continued)

(51) Int. Cl.
*H04M 3/42*   (2006.01)
*H04W 4/02*   (2018.01)
(Continued)

(52) U.S. Cl.
CPC ............. *H04W 4/02* (2013.01); *G06Q 30/02* (2013.01); *H04R 2420/07* (2013.01); *H04W 4/024* (2018.02)

(58) Field of Classification Search
CPC ........ H04W 4/02; H04W 4/024; G06Q 30/02; H04R 2420/07
(Continued)

(56) References Cited

U.S. PATENT DOCUMENTS

| 8,754,863 B2 | 6/2014 | Anantha et al. |
| 8,781,622 B2 | 7/2014 | Mockus et al. |

(Continued)

FOREIGN PATENT DOCUMENTS

| CN | 102682395 A | 9/2012 |
| EP | 1755242 A2 | 2/2007 |

(Continued)

OTHER PUBLICATIONS

Romanov, A., "The Case for Proximity Marketing," http://www.isignmedia.com/2011, iSign Media CORP, Richmond Hill, Ontario, 10 pages.

(Continued)

*Primary Examiner* — Marcos Batista
(74) *Attorney, Agent, or Firm* — Guntin & Gust, PLC; Jay H. Anderson

(57) ABSTRACT

A method includes receiving, from a mobile computing device at a kiosk in a retail store, a first audio signal. The first audio signal includes identifiers of items referenced in a shopping list of an application associated with the retail store. The application is executed at the mobile computing device. The method includes sending, from the kiosk to a server, data based on the identifiers. The method includes, receiving, at the kiosk from the server, item location data. The item location data identifies a particular item of the shopping list and a corresponding location of the particular item in the retail store. The method also includes sending, from the kiosk to the mobile computing device, a second signal. The second signal includes the item location data.

20 Claims, 7 Drawing Sheets

Related U.S. Application Data continuation of application No. 14/534,507, filed on Nov. 6, 2014, now Pat. No. 10,194,262.

(51) Int. Cl.
*G06Q 30/02* (2012.01)
*H04W 4/024* (2018.01)

(58) Field of Classification Search
USPC .............................. 455/456.1–456.3; 370/338
See application file for complete search history.

(56) References Cited

U.S. PATENT DOCUMENTS

| | | |
|---|---|---|
| 2008/0182591 A1 | 7/2008 | Krikorian |
| 2008/0228568 A1 | 9/2008 | Williams et al. |
| 2010/0198700 A1* | 8/2010 | Ramaswamy ......... G06Q 30/02 705/26.1 |
| 2010/0222041 A1 | 9/2010 | Dragt |
| 2010/0223120 A1 | 9/2010 | Dragt |
| 2011/0178863 A1 | 7/2011 | Daigle |
| 2012/0134238 A1 | 5/2012 | Surprenant et al. |
| 2012/0144347 A1 | 6/2012 | Jo et al. |
| 2012/0259732 A1* | 10/2012 | Sasankan .............. G01S 5/0205 705/26.9 |
| 2012/0276928 A1 | 11/2012 | Shutter |
| 2012/0282905 A1 | 11/2012 | Owen |
| 2013/0079037 A1 | 3/2013 | Dobyns |
| 2013/0171930 A1 | 7/2013 | Anand et al. |
| 2013/0203345 A1 | 8/2013 | Fisher |
| 2013/0252546 A1 | 9/2013 | Yoneyama |
| 2013/0267171 A1 | 10/2013 | Sarkar et al. |
| 2013/0297422 A1 | 11/2013 | Hunter et al. |
| 2014/0062852 A1 | 3/2014 | Naveh |
| 2014/0108149 A1 | 4/2014 | Jabara et al. |
| 2014/0135036 A1 | 5/2014 | Bonanni et al. |
| 2014/0143060 A1 | 5/2014 | Fernandez |
| 2014/0172557 A1 | 6/2014 | Eden et al. |
| 2014/0188989 A1 | 7/2014 | Stekkelpak et al. |
| 2014/0189733 A1 | 7/2014 | Anguiano |
| 2015/0079942 A1 | 3/2015 | Kostka et al. |

FOREIGN PATENT DOCUMENTS

| | | |
|---|---|---|
| EP | 2224323 A1 | 9/2010 |
| WO | 2012116213 A1 | 8/2012 |
| WO | 2013166158 A1 | 11/2013 |
| WO | 2014039293 A1 | 3/2014 |
| WO | 2014096511 A1 | 6/2014 |

OTHER PUBLICATIONS

"Will in-store, proximity-based marketing prove profitable?"brickmeetsclick.com, Apr. 1, 2014, Retreived from <http://www.brickmeetsclick.com/will-in-store--proximity-based-marketing-prove-profitable->, 2 pages.

Gottipati, H., "With iBeacon, Apple is going to dump on NFC and embrace the internet of things," Sep. 10, 2013, GigaOmniMedia, Inc., San Francisco, CA, 24 pages.

"I-Proximity", iproximity.net, 2014, 8 pages.

Herwono, I., et al., "Provisioning and performance of mobility-aware personalized push services in wireless broadband hotspots,"Computer Networks, Oct. 2005, vol. 49, Issue 3, Elsevier, Amsterdam, Netherlands, pp. 364-384.

Toye, E., et al., "Using Smart Phones to Access Site-Specific Services," Pervasive Computing, Mobile and Ubiquitous Systems, Apr.-Jun. 2005, vol. 4, No. 2, IEEE, Piscataway, NJ, pp. 60-66.

* cited by examiner

PROXIMITY-BASED ITEM DATA COMMUNICATION

PRIORITY CLAIM

This application claims priority from, and is a continuation of, U.S. patent application Ser. No. 16/250,178, filed on Jan. 17, 2019, which is a continuation of U.S. patent application Ser. No. 14/534,507, filed on Nov. 6, 2014, issued as U.S. Pat. No. 10,194,262, each of which is incorporated herein by reference in its entirety.

FIELD OF THE DISCLOSURE

The present disclosure is generally related to communication of item data, and more particularly to communication of item data in response to a determination of proximity of a device to a particular location.

BACKGROUND

There are many available location tracking technologies. However, some location tracking technologies may require significant investment and may provide limited accuracy for certain proximity-based applications. As an illustrative example, some location tracking technologies may not provide sufficient accuracy to allow an "intelligent shopping display" to detect a person carrying a portable computing device (e.g., a smartphone) within a close range.

DETAILED DESCRIPTION

Figure 1:
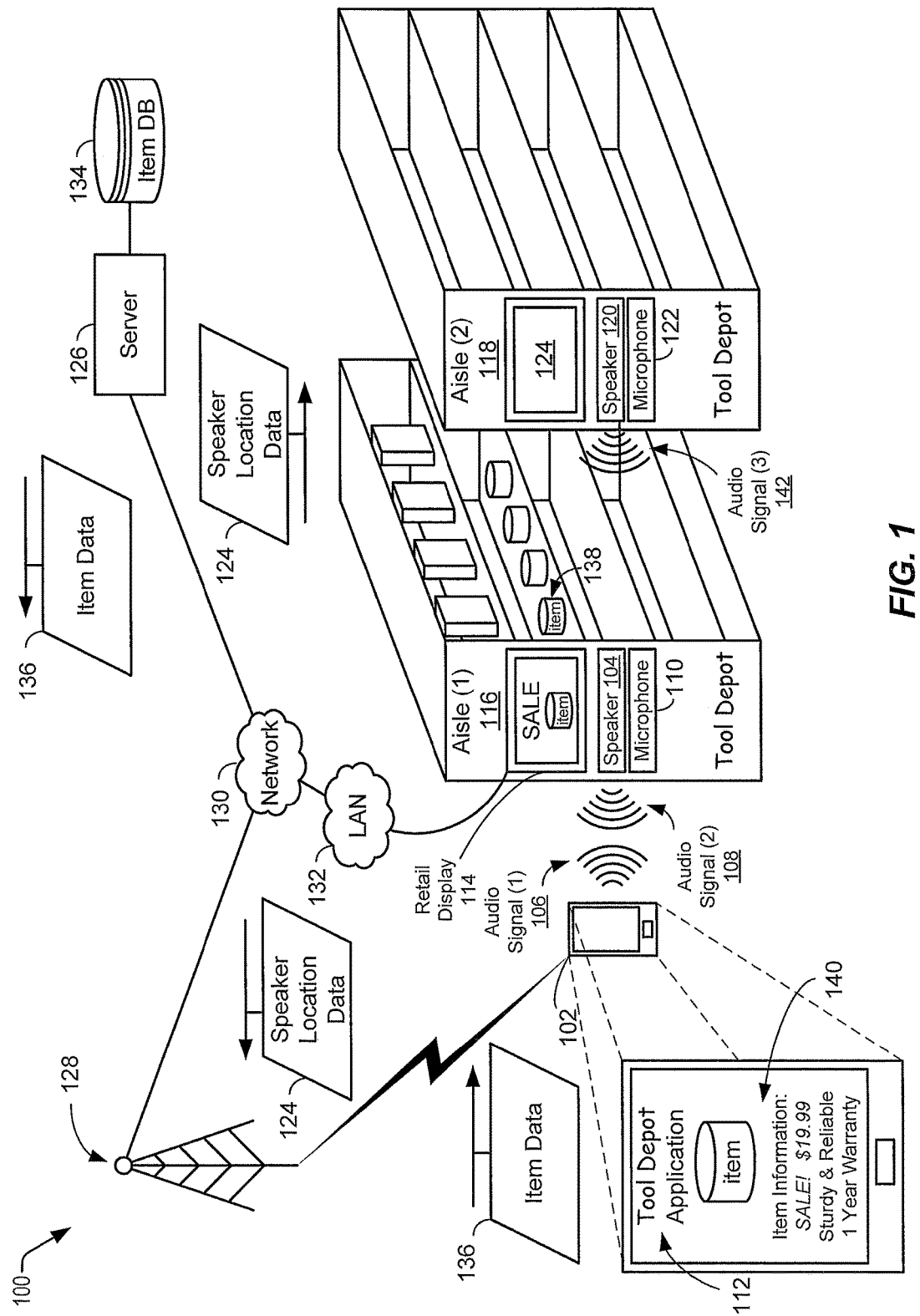
FIG. 1 is a diagram of a particular embodiment of a system for providing item data in response to a determination that a mobile computing device is proximate to a particular location based on an exchange of audio signals (e.g., in a human inaudible frequency range)

The present disclosure describes using audio capabilities of a mobile computing device and/or a display device to sense when the mobile computing device is within a viewing range of the display device (e.g., less than about 1 to 2 meters from the display device). In some cases, audio signal data packets may be encoded in and modulated into the human inaudible spectrum of 44.1-48 KHz (to prevent communication of signals within the human audible spectrum), and the audio signal data packets may be transmitted at a power level to be detectable via a microphone when the mobile computing device is within the viewing range. A server may communicate item data associated with one or more items proximate to the display device to a mobile computing device for display via an application executing at the mobile computing device, to another computing device for display at the display device, or a combination thereof.

To illustrate, a proximity-based data communication system may include a cloud/server-based system that communicates with a display device (e.g., a retail display). For example, the display device may include or may be proximate to a microphone and a speaker at a particular location within a retail store (e.g., on a particular aisle, proximate to particular items, etc.). In some cases, the retail display may provide information that may be relevant to a shopper at the retail store (e.g., a storewide sale) or that may be relevant to the shopper at the particular location within the retail store (e.g., a sale on particular items that are located near the retail display), among other alternatives. A device (e.g., a phone or other mobile computing device) may emit sound that is detected by the microphone associated with the retail display. The speaker associated with the retail display may also emit sound that is detected by the mobile computing device. For example, the mobile computing device may emit sound that may be detected by the speaker associated with the retail display to indicate that the mobile computing device is within a viewing range of the retail display (e.g., less than about 1 to 2 meters from the retail display). The speaker associated with the retail display may emit sound that includes information associated with a location of the speaker. For example, a computing device associated with the retail display may encode speaker location data within an audio signal to indicate a location associated with the speaker. To illustrate, the speaker location data may include an identifier of the retail display (e.g., a retail display identifier, an aisle number, or location coordinates, among other alternatives) and an identifier of a particular retail location (e.g., a store number or a store address, among other alternatives). An application executing at the mobile computing device may detect the sound, extract the speaker location data by decoding the audio signal, and send information associated with the speaker location data to a server.

The server may determine, based on the speaker location data, item data that includes information associated with item(s) that are located proximate to the speaker. In some cases, the server may send the item data to the mobile computing device, and the application executing at the mobile computing device may display the item data. Alternatively or additionally, the server may send the item data to the computing device associated with the retail display for display at the retail display. In an alternative example, phone identification information may be encoded into audio signal data packets at the mobile computing device. The phone identification information may be detected at the microphone associated with the retail display and communicated to the server. In this example, the phone identification information may be used to provide a customized display of information that is targeted to a particular user (e.g., via the mobile computing device, the retail display, or a combination thereof). As an illustrative, non-limiting example, the phone identification information may be used to identify a shopper as being associated with a particular demographic profile, and the customized display of information may include information associated with item(s) that are popular with the particular demographic profile and that are located proximate to the retail display.

In a particular embodiment, a method includes receiving an audio signal at a mobile computing device. The method includes determining whether the audio signal is within a particular frequency range using an application executing at the mobile computing device. When the audio signal is within the particular frequency range, the method may include processing the audio signal to determine speaker location data. The speaker location data is encoded within the audio signal and indicates a location associated with a speaker generating the audio signal. The method also includes sending a message including information associated with the speaker location data from the mobile computing device to a server (e.g., a server associated with a retail entity that may be identified by the application executing at the mobile computing device). The method further includes receiving item data from the server. The item data is related to an item that is located proximate to the speaker, and the mobile computing device may display information descriptive of the item based on the item data.

In another particular embodiment, a computer-readable storage device stores instructions that, when executed by a processor, cause the processor to perform operations. For example, the computer-readable storage device and the processor may be included within a mobile computing device (e.g., a smartphone). The operations include determining whether an audio signal is within a particular frequency range. When the audio signal is within the particular frequency range, the audio signal may be processed to determine speaker location data. The speaker location data is extracted from the audio signal and indicates a location associated with a speaker. The operations further include sending a message including information associated with the speaker location data to a server and receiving item data from the server. The item data identifies an item that is located proximate to the speaker. The operations may include generating an alert in response to determining that the item is associated with a particular item on a shopping list.

In another particular embodiment, an apparatus includes a speaker, a microphone, a processor, and a memory. The memory is accessible to the processor and includes instructions executable by the processor to perform operations. The operations include determining speaker location data associated with the speaker. The speaker may be associated with a particular retail display (e.g., a retail display associated with a particular aisle of merchandise) of a set of retail displays of a particular retail location (e.g., a particular store) of a set of retail locations associated with a single retail entity (e.g., a "brick-and-mortar" retailer). The speaker location data may include an identifier of the particular retail display and an identifier of the particular retail location. The operations may include causing transmission of a first audio signal via the speaker. The first audio signal may be modulated within a human inaudible frequency range, and the speaker location data may be encoded within the first audio signal. A second audio signal from a mobile computing device may be received at the microphone. The second audio signal may be modulated within the human inaudible frequency range. The operations may include causing transmission of a message including information associated with the speaker location data to a server and receiving item data from the server that identifies an item that is located proximate to the speaker.

Referring to FIG. 1, a particular embodiment of a system of communicating item data is illustrated and generally designated 100. FIG. 1 illustrates that item data may be provided in response to a determination that a mobile computing device 102 is proximate to a particular location (e.g., a speaker 104 located within a particular store of a retail entity, such as "Tool Depot" in the example of FIG. 1) based on an exchange of audio signals (e.g., in a human inaudible frequency range). For example, the mobile computing device 102 may emit a first audio signal 106, and the speaker 104 may emit a second audio signal 108. In some cases, the second audio signal 108 may be detectable at the mobile computing device 102 when the mobile computing device 102 is within a particular range of the speaker 104 (e.g., at a distance of less than about 1 to 2 meters from the speaker 104). Further, the first audio signal 106 may be detectable by a microphone 110 associated with the particular location (e.g., within a retail store) when the mobile computing device 102 is within a particular range of the microphone 110 (e.g., at a distance of less than about 1 to 2 meters from the microphone 110). Thus, FIG. 1 illustrates that when the mobile computing device 102 is proximate to the particular location, data may be communicated from the mobile computing device 102 to the microphone 110 via the first audio signal 106, from the speaker 104 to the mobile computing device 102 via the second audio signal 108, or a combination thereof.

In the particular example of FIG. 1, an application 112 may be executing at the mobile computing device 102. In some cases, the application 112 may be associated with a particular retail entity (e.g., "Tool Depot" in the example of FIG. 1), and in some cases a user may launch the application 112 when the user is located at a particular retail location of the retail entity (e.g., before entering the particular retail location or after entering the particular retail location). In FIG. 1, the speaker 104 may be associated with a first retail display 114 that may be located at a first aisle 116 at the particular retail location. For illustrative purposes only, FIG. 1 further illustrates a second aisle 118 that includes a second speaker 120 and a second microphone 122. However, it will be appreciated that more than two aisles of merchandise may be present at the particular retail location. FIG. 1 further illustrates that a second retail display 124 may be associated with the second aisle 118. However, it will be appreciated that retail displays may not be associated with each aisle at the particular retail location. Alternatively, multiple retail displays, speakers, microphones, or combinations thereof may be located at various locations within the particular retail location. In a particular embodiment, at least one retail display (including associated speakers and microphones) may be associated with each aisle of merchandise at the particular retail location.

In a particular embodiment, the mobile computing device 102 may be configured to receive the second audio signal 108. The application 112 executing at the mobile computing device 102 may be configured to determine whether the second audio signal 108 is within a particular frequency range. For example, the particular frequency range may include a human inaudible frequency range of about 44.1 KHz to about 48 KHz. Based on a determination that the second audio signal 108 is within the particular frequency range, the mobile computing device 102 may be configured to process the second audio signal 108 to determine speaker location data 124. The speaker location data 124 may be encoded within the second audio signal 108 and may indicate a location (e.g., an aisle number, a store number, etc.) associated with the speaker 104 that is generating the second audio signal 108. To illustrate, a computing device (not shown in FIG. 1) associated with the speaker 104 may encode the speaker location data 124 within the second audio signal 108. The speaker 104 may be separate from or included within the computing device. The speaker 104 may be communicatively coupled to the computing device via a wired connection, a wireless connection, or a combination thereof. The application 112 executing at the mobile computing device 102 may include logic to decode the second audio signal 108 in order to extract the speaker location data 124.

In some embodiments, the mobile computing device 102 may be configured to send a message including the speaker location data 124 to a server 126 via one or more networks. For example, the mobile computing device 102 may send the message including the speaker location data 124 to the server 126 via a first network 130 (e.g., a wireless network), via a second network 130 (e.g., the Internet), or a combination thereof. Further, in some cases, the network 130 may be accessible to the mobile computing device 102 via a wireless connection (e.g., a Wi-Fi connection) to an access point of a local area network (LAN) 132 associated with the particular retail location.

In the example of FIG. 1, the server 126 may be associated with a retail entity (e.g., "Tool Depot") and may be configured to query an item database 134 to determine item data 136 that identifies an item 138 (or a plurality of items) that is located proximate to the speaker 104. For example, FIG. 1 illustrates that the item 138 may be located in the first aisle 116. While FIG. 1 illustrates an example in which the speaker 104 is located at an end of the first aisle 116 (e.g., at an "end cap" of the first aisle 116), it will be appreciated that the speaker 104 may be located at another location (e.g., near particular merchandise, such as the item 138, on the first aisle 116). In some cases, the speaker location data 124 may include an identifier of the particular retail display (e.g., an identifier, such as a unique retail display identifier, associated with the first retail display 114) and an identifier of the particular retail location (e.g., a unique retail location identifier, such as a store number or other identifier of the particular "Tool Depot" location). In some cases, the item data 136 may identify a plurality of items associated with the particular retail display (e.g., the first retail display 114) based on mapping information for the particular retail display and the particular retail location available to the server 126. As an illustrative, non-limiting example, the server 126 may query the item database 134 based on a retail display identifier (e.g., an aisle number, GPS coordinates, a location associated with a particular aisle, or a combination thereof, among other alternatives) and a retail location identifier (e.g., a store number).

In some cases, the mobile computing device 102 may be configured to receive the item data 136 that identifies the item 138 that is located proximate to the speaker 104 and to display information 140 that is descriptive of the item 138 based on the item data 136. In the example illustrated in FIG. 1, the information 140 includes an image of the item 138, an indication that the item 138 is on sale, a price of the item 138, one or more features of the item 138 (e.g., sturdy, reliable), and warranty information for the item 138. In some cases, the retail entity (e.g., "Tool Depot") may be promoting the item 138. Alternatively, a manufacturer of the item 138 or another entity (e.g., a "do it yourself" publication) may be promoting the item 138. However, it will be appreciated that the example of FIG. 1 is for illustrative purposes only, and various other types of information associated with the item 138 may be displayed via the application 112 that is executing at the mobile computing device 102. Further, in some cases, the item data 136 may include information associated with multiple items, and information associated more than one item may be displayed. In a particular embodiment, when the mobile computing device 102 is no longer within a viewing range of the retail display 114 (e.g., when a shopper proceeds down the first aisle 116, proceeds to the second aisle 118, etc.), the information 140 may no longer be displayed.

FIG. 1 illustrates that, alternatively or additionally, the first retail display 114 may be configured to display information associated with the item 138. For example, FIG. 1 illustrates that the first retail display 114 may display an indication that the item 138 is on sale. As described further herein with respect to FIG. 2, the first retail display 114 may display alternative or additional information associated with a particular item (e.g., a location of the particular item on the first aisle 116). In some cases, the server 126 may send the information associated with the item 138 to a computing device (not shown in FIG. 1) for display at the first retail display 114 via the network 130, the LAN 132, or a combination thereof. In some embodiments, responsive to detecting that the mobile computing device 102 is within a viewing range (e.g., within a range of less than about 1 to 2 meters), the first retail display 114 may be configured to establish a wired or wireless connection with the LAN 132 in order to send the speaker location data 124 to the server 126. The server 126 may determine information for display via the first retail display 114 based on the speaker location data 124 (e.g., by querying the item database 134). Thus, in some embodiments, the speaker location data 124 may be sent to the server 126 via a computing device other than the mobile computing device 102.

While not illustrated in the example of FIG. 1, the mobile computing device 102 may be configured to receive another audio signal. For example, the mobile computing device 102 may come into range of a third audio signal 142 generated by the second speaker 120 associated with the second aisle 118. In this case, the mobile computing device 102 may be configured to determine whether the third audio signal 142 is within the particular frequency range using the application 112. When the third audio signal 142 is within the particular frequency range, the mobile computing device 102 may be configured to process the third audio signal 142 to determine second speaker location data. The second speaker location data may be encoded in the third audio signal 142 and may indicate the second location associated with the second speaker 120 that is generating the third audio signal 142. The mobile computing device 102 may be configured to send a second message (not shown in FIG. 1) that includes the second speaker location data to the server 126. The mobile computing device 102 may receive second item data (not shown in FIG. 1) that identifies a second item that is located proximate to the second speaker 120. While not shown in FIG. 1, the application 112 that is executing at the mobile computing device 102 may display information descriptive of the second item based on the second item data. Alternatively or additionally, a second retail display 124 may be configured to display information associated with the second item that is located proximate to the second speaker 120.

Thus, FIG. 1 illustrates that the application 112 executing at the mobile computing device 102 may display the information 140 associated with the item 138 that is located proximate to the speaker 104. The information 140 may be received at the mobile computing device 102 when the mobile computing device 102 is located within a particular range of the speaker 104. The speaker location data 124 may be encoded into the second audio signal 108, and the mobile computing device 102 may send the speaker location data 124 to the server 126 (e.g., via the wireless network 128) and may receive the item data 136 from the server 126. FIG. 1 further illustrates that, in some cases, the first retail display 114 may display information associated with the item 138 in response to the microphone 110 detecting that the mobile computing device 102 is located within a viewing range based on the first audio signal 106.

Figure 2:
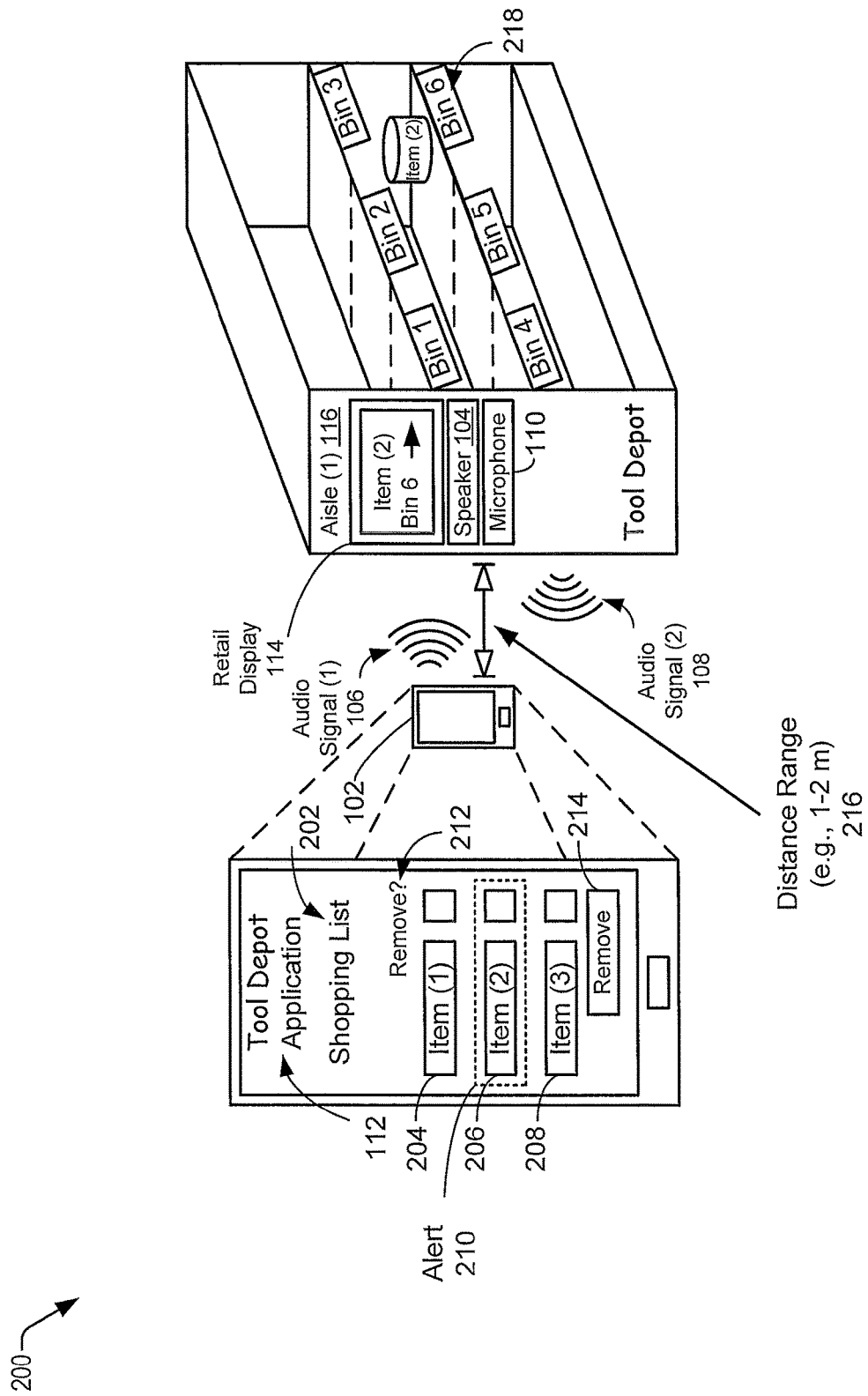
FIG. 2 is a diagram of another embodiment of a system for providing item data in response to a determination that a mobile computing device is proximate to a particular location based on an exchange of audio signals (e.g., in a human inaudible frequency range)

FIG. 2 illustrates another embodiment of a system 200 for providing item data in response to a determination that a mobile computing device is proximate to a particular location based on an exchange of audio signals. In FIG. 2, the application 112 includes a shopping list 202 that identifies one or more items. In the illustrative example of FIG. 2, the shopping list 202 identifies multiple items, including a first item 204, a second item 206, and a third item 208. However, it will be appreciated that the shopping list 202 may include an alternative number of items. FIG. 2 illustrates that an alert 210 may be generated in response to a determination that an item that is located proximate to the speaker 104 is associated with a particular item on the shopping list 202 (e.g., the second item 206 in the example of FIG. 2). FIG. 2 further illustrates that the first retail display 114 may provide information regarding a location (e.g., a bin identifier, a shelf identifier, or a distance from the retail display 114, among other alternatives) of the particular item on the shopping list 202 (e.g., the second item 206) on the first aisle 116.

As further described with respect to FIG. 1, the mobile computing device 102 may determine whether the second audio signal 108 is within a particular frequency range (e.g., in a human inaudible frequency range). Based on a determination that the second audio signal 108 is within the particular frequency range, the mobile computing device 102 may process the second audio signal 108 to determine speaker location data. Referring to FIG. 1, the mobile computing device 102 may send a message including the speaker location data 124 via a network to the server 126. The mobile computing device 102 may receive item data from the server 126 that identifies an item that is located proximate to the speaker 104. To illustrate, in the example of FIG. 2, the item data may identify at least one item (e.g., the second item 206).

The mobile computing device 102 may be configured to determine whether the item that is located proximate to the speaker 104 is associated with a particular item on the shopping list 202. To illustrate, in the example of FIG. 2, the application 112 may determine that the item data includes information associated with the second item 206 on the shopping list 202. In response, the application 112 may be configured to generate the alert 210 to indicate to a user that the user is located in close proximity to a particular item (e.g., the second item 206) on the shopping list 202, potentially allowing the user to more easily locate the particular item at the particular retail location. While FIG. 2 illustrates a particular example in which the alert 210 includes a visual indication (e.g., dashed lines around the second item 206 on the shopping list 202), alternative alerts are possible. For example, the alert 210 may include a visual indication, an audible indication, a vibration, or any combination thereof.

FIG. 2 further illustrates a particular embodiment in which the application 112 may display an indication 212 that a particular item may be removed from the shopping list 202. As an illustrative, non-limiting example, a user may select the selectable removal option 212 (e.g., a checkbox, radio box, etc.) to identify the second item 206 as an item to be removed and may select a selectable removal option 214 to remove the second item 206 from the shopping list 202. In alternative embodiments, the user may select an option (e.g., a checkbox, radio box, etc.) to indicate that an item on the shopping list 202 has been retrieved, allowing the user to identify particular items that have been retrieved and particular items that have not yet been retrieved. While not shown in FIG. 2, the application 112 may update the shopping list 202 to remove a particular selected item (e.g., the second item 206) in response to selection of the selectable removal option 214.

In the particular embodiment illustrated in FIG. 2, the first retail display 114 displays information associated with the second item 206 on the shopping list 202. In the example of FIG. 2, the information displayed at the first retail display 114 includes an indication that the second item 206 is located at a particular location on the first aisle 116 (e.g., in a particular bin 218). FIG. 2 illustrates that providing a shopper with more detailed location information for a particular item on the shopping list 202 (e.g., an indication of a location of the particular item on the first aisle 116) may allow the shopper to more quickly locate the particular item on the shopping list 202.

Figure 3:
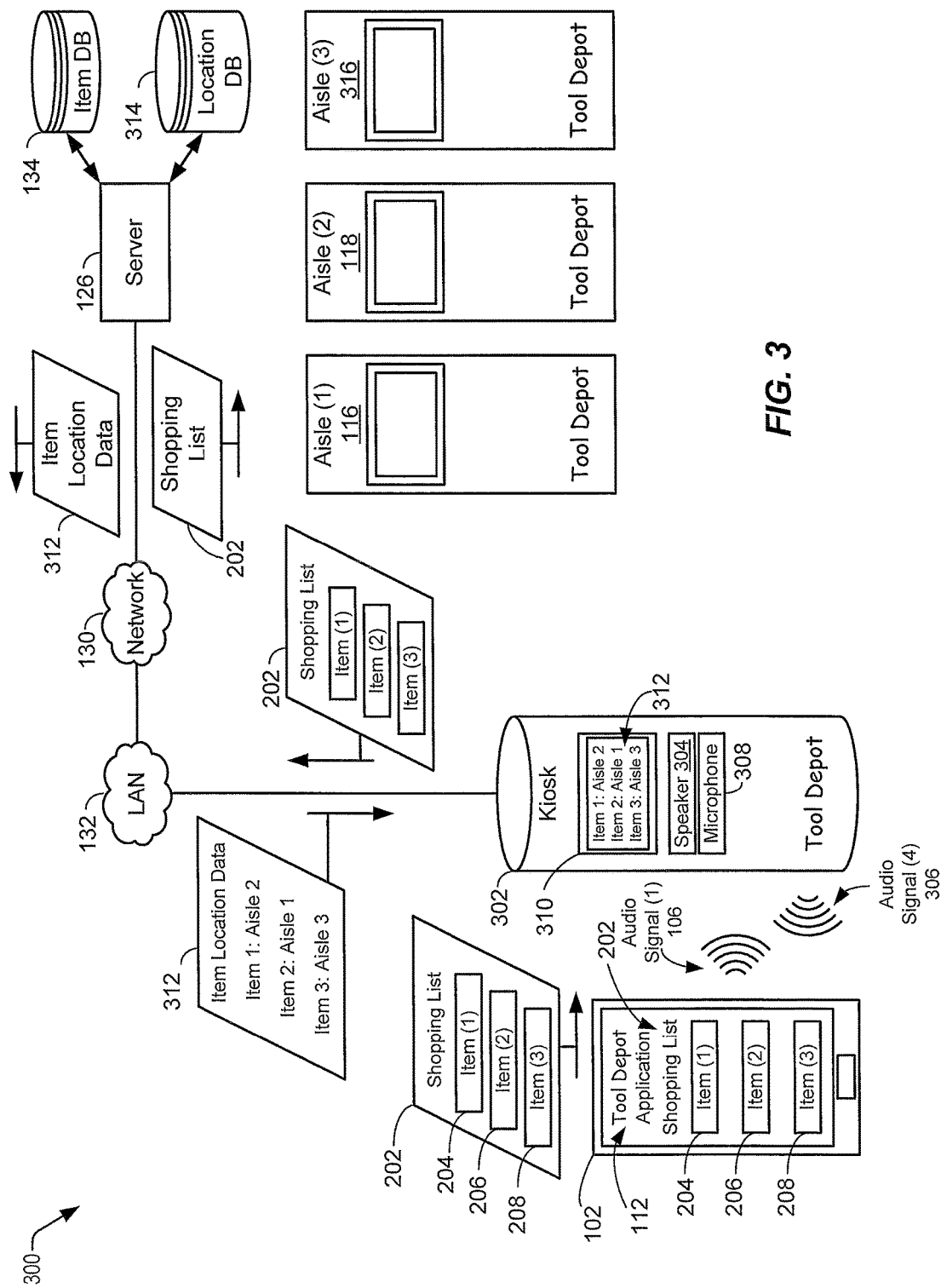
FIG. 3 is a diagram of another embodiment of a system for providing item data in response to a determination that a mobile computing device is proximate to a particular location based on an exchange of audio signals (e.g., in a human inaudible frequency range)

Referring to FIG. 3, another embodiment of a system for providing item data is illustrated and generally designated 300. In FIG. 3, the shopping list 202 described with respect to FIG. 2 may be communicated to the server 126 in order to identify location(s) of particular item(s) on the shopping list 202. In the example of FIG. 3, a kiosk 302 includes a speaker 304 to generate an audio signal 306 (identified in FIG. 3 as "Audio Signal (4)"), a microphone 308 to receive the first audio signal 106 from the mobile computing device 102, and a retail display 310. However, it will be appreciated that the kiosk 302 is for illustrative purposes only and that other speakers/microphones/displays at alternative locations may be used. To illustrate, referring to FIG. 1, the first speaker 104 may be used to generate the audio signal 306 and the first microphone 110 of the first aisle 116 may be used to receive the first audio signal 106, or the second speaker 120 may be used to generate the audio signal 306 and the second microphone 122 of the second aisle 118 may be used to receive the first audio signal 106.

FIG. 3 illustrates that the application 112 executing on the mobile computing device 102 may transmit the shopping list 202 to the kiosk 302 (e.g., via the audio signal 106). The kiosk 302 may be configured to send information associated the shopping list 202 to the server 126 via one or more networks. For example, the kiosk 302 may send the shopping list 202 to the server 126 via the LAN 132, the network 130, or a combination thereof. In response to receiving the shopping list 202, the server 126 may be configured to determine item location data 312. For example, the item location data 312 may identify a particular location within the retail location where the item(s) on the shopping list 202 may be found. To illustrate, the server 126 may query the item database 134, a location database 314, or a combination thereof to determine a location associated with the first item 204, the second item 206, and the third item 208 on the shopping list 202. The server 126 may send the item location data 312 to the kiosk 302 for display via the retail display 310.

In the illustrative example of FIG. 3, the item location data 312 includes a first indication that the first item 204 is located on the second aisle 118, a second indication that the second item 206 is located on the first aisle 116, and a third indication that the third item 208 is located on a third aisle 316. In alternative embodiments, more than three aisles may be associated with the retail location. Further, in some cases, one or more items on the shopping list 202 may not be located at the particular retail location (e.g., one or more items may be located at a different store). FIG. 3 further illustrates that, in some embodiments, the speaker 304 may transmit the audio signal 306 to the mobile computing device 102. The audio signal 306 may be modulated within the human inaudible frequency range, and item data (e.g., the item location data 312) may be encoded within the audio signal 306. While not shown in FIG. 3, the application 112 executing at the mobile computing device 102 may display the item location data 312 (e.g., in a currently displayed window or in a newly displayed window).

Figure 4:
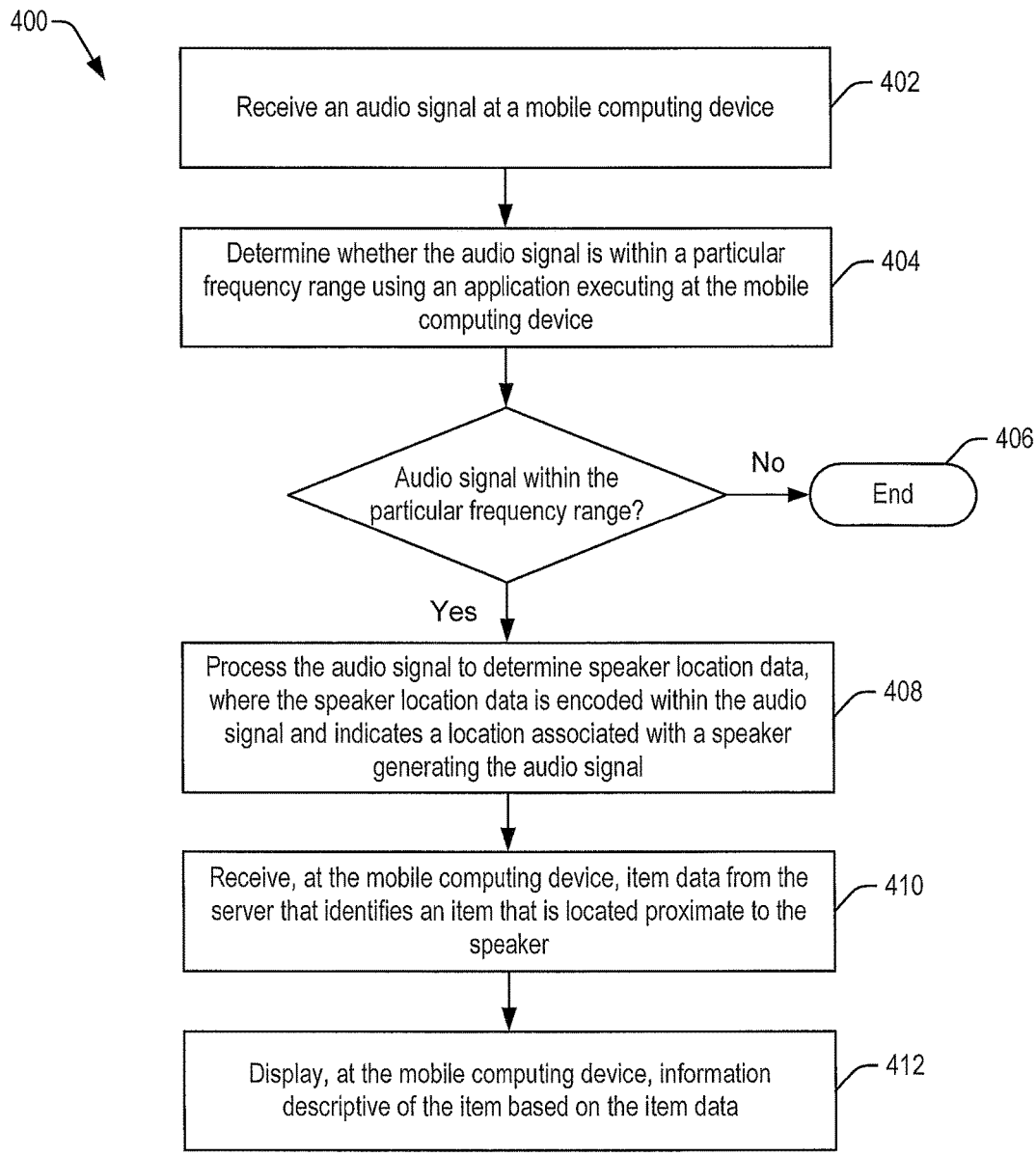
FIG. 4 is a flowchart of a particular embodiment of a method to display information descriptive of an item that is located proximate to a particular location at a mobile computing device.

Referring to FIG. 4, a particular embodiment of a method to display information descriptive of an item that is located proximate to a particular location (e.g., within a retail store) at a mobile computing device is illustrated and generally designated 400.

The method 400 includes receiving an audio signal at a microphone associated with a mobile computing device, at 402. For example, referring to FIG. 1, the mobile computing device 102 may receive the second audio signal 108 from the speaker 104 associated with the first aisle 116.

The method 400 includes determining whether the audio signal is within a particular frequency range using an application executing at the mobile computing device, at 404. For example, referring to FIG. 1, the application 112 executing at the mobile computing device 102 may include an application associated with a retail entity (e.g., "Tool Depot") that determines whether the second audio signal 108 is within the particular frequency range. In some cases, the second audio signal 108 may be modulated within a human inaudible frequency range of about 44.1 KHz to about 48 KHz. Further, in some cases, the second audio signal 108 may be amplified by the speaker 104 to a magnitude that is detectable by the mobile computing device 102 when the mobile computing device 102 is located within a particular range of the speaker 104 (e.g., less than about 1 to 2 meters from the speaker 104). In some cases, the second audio signal 108 may not be detectable when the mobile computing device 102 is located outside the range (e.g., more than about 2 meters from the speaker 104).

In response to a determination that the audio signal is not within the particular frequency range, the method may end, at 406. In response to a determination that the audio signal is within the particular frequency range, the method may include processing the audio signal to determine speaker location data, at 408. The speaker location data is encoded within the audio signal and indicates a location associated with a speaker generating the audio signal.

For example, referring to FIG. 1, the speaker location data 124 may be encoded within the second audio signal 108 and may indicate the location associated with the speaker 104. In a particular embodiment, the speaker 104 may be associated with the first retail display 114 of a set of retail displays of a particular retail location of a set of retail locations associated with a single retail entity (e.g., "Tool Depot"). In some cases, the speaker location data 124 may include an identifier of the particular retail display (e.g., the first retail display 114) and an identifier of the particular retail location (e.g., an identifier, such as a store number, of a particular "Tool Depot" retail location). While FIG. 1 illustrates one example where the item data 136 includes information associated with a single item (e.g., the item 138), in other cases the item data 136 may identify a plurality of items associated with the particular retail display (e.g., the first retail display 114). In some cases, the item data 136 associated with the particular retail display (e.g., the first retail display 114) may be determined based on information for the particular retail display and information for the particular retail location available to the server 126. To illustrate, the server 126 may query the item database 134 to determine the item data 136 that is associated with the particular retail display (e.g., the first retail display 114). As an illustrative, non-limiting example, the item database 134 may identify individual retail displays by unique retail display identifiers and may identify individual retail stores by unique retail location identifiers. Further, the item database 134 may store information regarding particular items that are proximate to particular retail displays at particular retail locations. In some cases, the item database 134 may be periodically updated to track re-location of item(s), addition of item(s), and removal of item(s). To illustrate, an employee or other individual at a particular retail location may provide periodic updates to the server 126 that may be reflected in the item database 134.

The method 400 includes sending a message including the speaker location data via a network from the mobile computing device to a server, at 408. For example, referring to FIG. 1, the application 112 that is executing at the mobile computing device 102 may be associated with a retail entity (e.g., "Tool Depot") and may send a message that includes the speaker location data 124 to the server 126 (e.g., a "Tool Depot" server identified by the application). In the embodiment illustrated in FIG. 1, the speaker location data 124 may be sent to the server 126 via the wireless network 128 and the network 130. Alternatively, the speaker location data 124 may be sent to the server 126 via the wireless network 128, the network 130, the LAN 132, or any combination thereof.

The method 400 includes receiving, at the mobile computing device, item data from the server that identifies an item that is located proximate to the speaker, at 410. To illustrate, referring to the example of FIG. 1, the mobile computing device 102 may receive the item data 136 from the server 126. In the example of FIG. 1, the server 126 communicates the item data 136 to the mobile computing device 102 via the network 130 (e.g., the Internet) and via a separate wireless network 128. Alternatively, the item data 136 may be communicated from the server 126 to the mobile computing device 102 via the wireless network 128, the network 130, the LAN 132, or any combination thereof. For example, while not shown in FIG. 1, the mobile computing device 102 may communicate with the server 126 via another wireless network (e.g., a Wi-Fi network associated with the particular retail location) that may provide access to the network 130 (e.g., the Internet).

The method 400 includes displaying, at the mobile computing device, information descriptive of the item based on the item data, at 412. For example, referring to FIG. 1, the application 112 executing at the mobile computing device 102 may display the information 140 that is descriptive of the item 138 based on the item data 136.

Thus, FIG. 4 illustrates that information associated with an item may be received at a mobile computing device in response to the mobile computing device being located within a particular range of a speaker (e.g., at a retail location). The mobile computing device may communicate speaker location data to a server, and the server may communicate item data to the mobile computing device. The application executing at the mobile communication device may display the item data received from the server.

Figure 5:
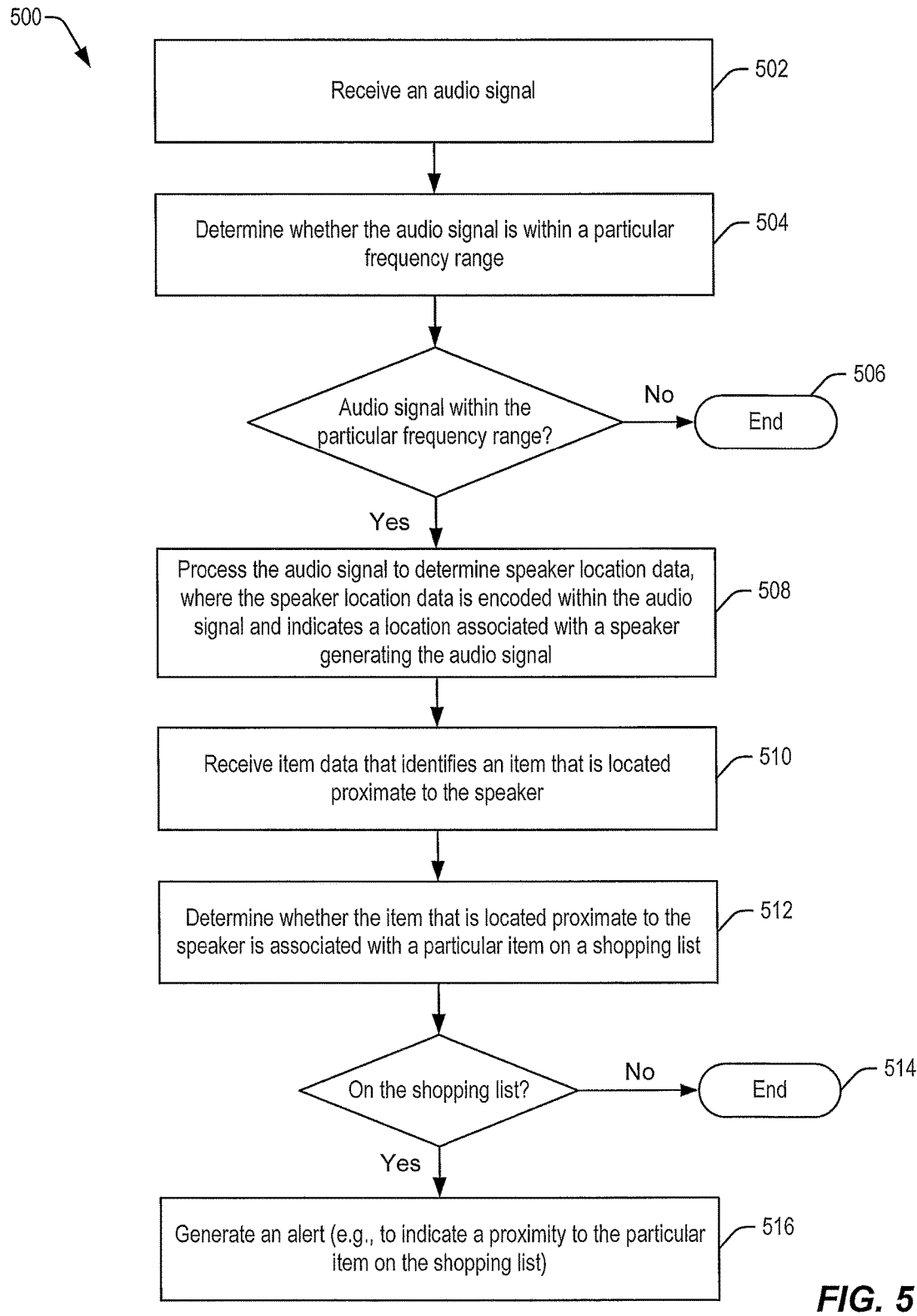
FIG. 5 is a flowchart of a particular embodiment of a method to generate an alert at a mobile computing device in response to determining that an item that is located proximate to a particular location is included on a shopping list.

Referring to FIG. 5, a particular embodiment of a method to generate an alert at a mobile computing device in response to determining that an item that is located proximate to a particular location is included on a shopping list is illustrated and generally designated 500.

The method 500 includes receiving an audio signal, at 502. For example, referring to the example of FIG. 2, the mobile computing device 102 may receive the second audio signal 108 from the speaker 104. In response to receiving the audio signal, the method 500 includes determining whether the audio signal is within a particular frequency range, at 504. When the audio signal is not within the particular frequency range, the method 500 may end at 506. When the audio signal is within the frequency range, the method 500 may include processing the audio signal to determine speaker location data, at 508. The speaker location data may be encoded within the audio signal and may indicate a location associated with a speaker that is generating the audio signal. For example, referring to FIG. 2, the speaker location data may be encoded within the second audio signal 108 and may indicate a location associated with the speaker 104.

The method 500 includes receiving item data that identifies an item that is located proximate to the speaker, at 510. The method 500 includes determining whether the item that is located proximate to the speaker is associated with a particular item on a shopping list, at 512. When the item is not associated with a particular item on the shopping list, the method 500 may end at 514. When the item is associated with a particular item on the shopping list, the method 500 may include generating an alert to indicate a proximity to the particular item on the shopping list, at 516. In some cases, the alert may include a visual indication, an audible indication, a vibration, or a combination thereof. In the particular example illustrated in FIG. 2, the alert 210 includes a visual indication (e.g., a dashed line around the second item 206 on the shopping list 202). However, it will be appreciated that the alert 210 may include an alternative visual indication, an audible indication, a vibration, or a combination thereof. FIG. 2 also illustrates a particular embodiment in which the mobile computing device 102 displays a selectable removal option 214 to remove a particular item (e.g., the second item 206 identified via a selectable checkbox) from the shopping list 202. To illustrate, a user of the mobile computing device 102 may receive the alert 210 and retrieve the second item 206 from a particular location (e.g., the bin 218). Thus, the selectable removal option 214 may allow the user to remove items from the shopping list 202 as the user locates items on the shopping list 202 (e.g., adds the items to a physical shopping cart).

Figure 6:
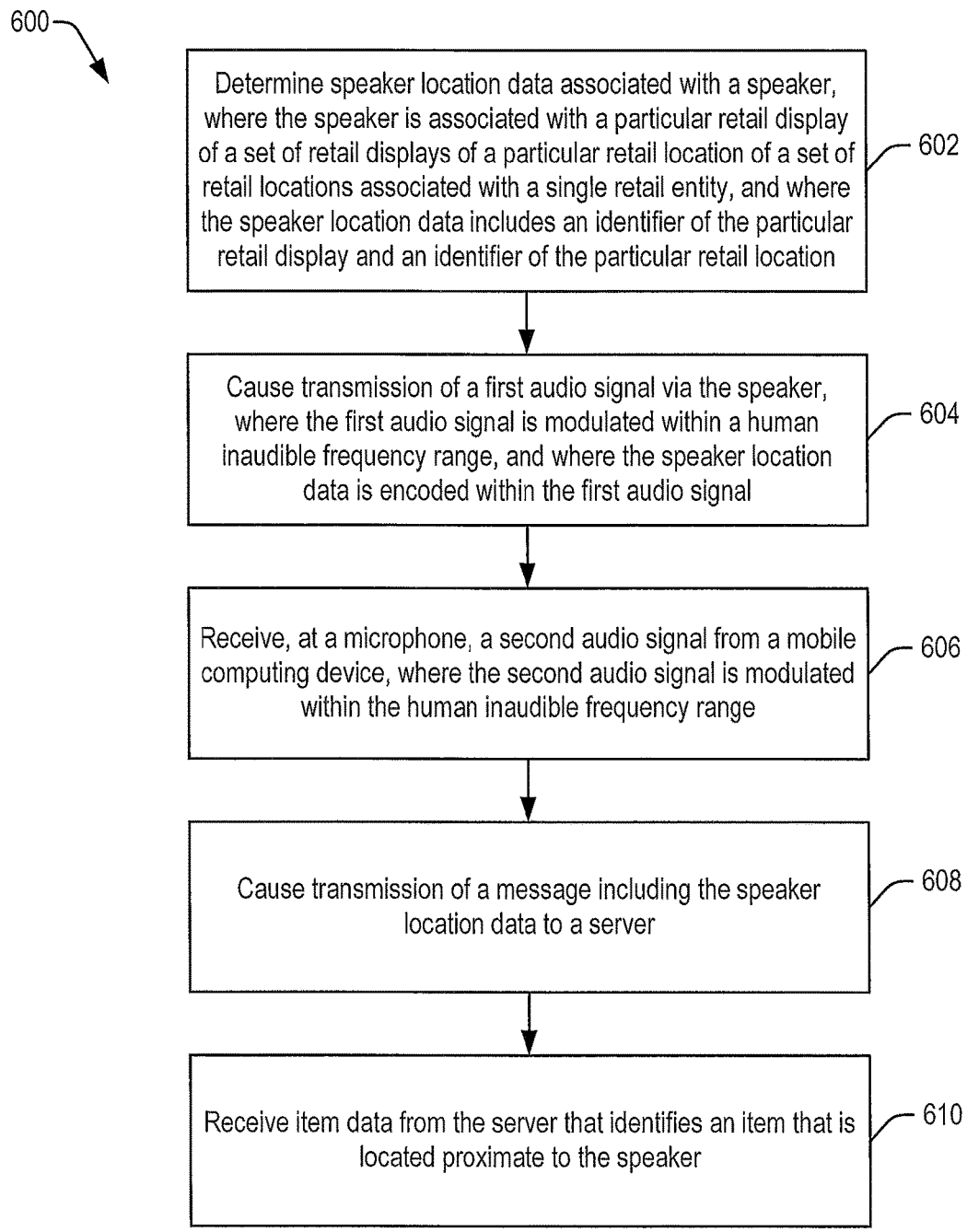
FIG. 6 is a flowchart of a particular embodiment of a method to provide item data via a speaker at a particular location via an audio signal that is modulated within a human inaudible frequency range. The item data is received from a server via a network and identifies an item that is located proximate to the speaker at the particular location.

Referring to FIG. 6, another particular embodiment of a method to provide item data via a speaker at a particular location via an audio signal that is modulated within a human inaudible frequency range is illustrated and generally designated 600.

The method 600 includes determining speaker location data associated with the speaker, at 602. The speaker may be included within or proximate to a particular retail display of a set of retail displays at a particular retail location. Further, the speaker location data may include an identifier of the particular retail display (e.g., a retail display identifier) and an identifier of the particular retail location (e.g., a store number).

The method 600 includes causing transmission of a first audio signal via the speaker, at 604. The first audio signal may be modulated within a human inaudible frequency range, and the speaker location data associated with the speaker may be encoded within the first audio signal and transmitted from the speaker associated with the retail display to a mobile computing device. The method 600 includes receiving a second audio signal at the microphone associated with the retail display from a mobile computing device, at 606. The second audio signal may be modulated within the human inaudible frequency range. The method 600 further includes causing transmission of a message including the speaker location data to a server, at 608.

The method 600 includes receiving item data, at 610. The item data may be received from the server and may identify an item that is located proximate to the speaker. In some embodiments, the item data may further identify a particular location of the item at the particular retailer location.

While not illustrated in FIG. 6, in some embodiments the method 600 may include causing transmission of a third audio signal to the mobile computing device via the speaker. The third audio signal may be modulated within the human inaudible frequency range, and the item data may be encoded within the third audio signal. Further, while not illustrated in FIG. 6, in some embodiments the method 600 may further include causing display of the item data via the particular retailer display. To illustrate, referring to the example of FIG. 1, an indication that the item 128 is on sale may be displayed at the retail display 114. As another example, referring to FIG. 2, an indication of a particular location of the second item 206 on the first aisle 116 may be displayed at the first retail display 114.

Thus, FIG. 6 illustrates a particular example of a method of providing item data via a speaker at a particular location via an audio signal that is modulated within a human inaudible frequency range. The item data identifies item(s) located proximate to the speaker at the particular location. The item data may provide an improved shopping experience and may allow a retailer to provide information regarding item(s) that may be relevant to a shopper when the shopper is determined to be within a close range of a particular location (e.g., less than about 1 to 2 meters from the particular location).

Figure 7:
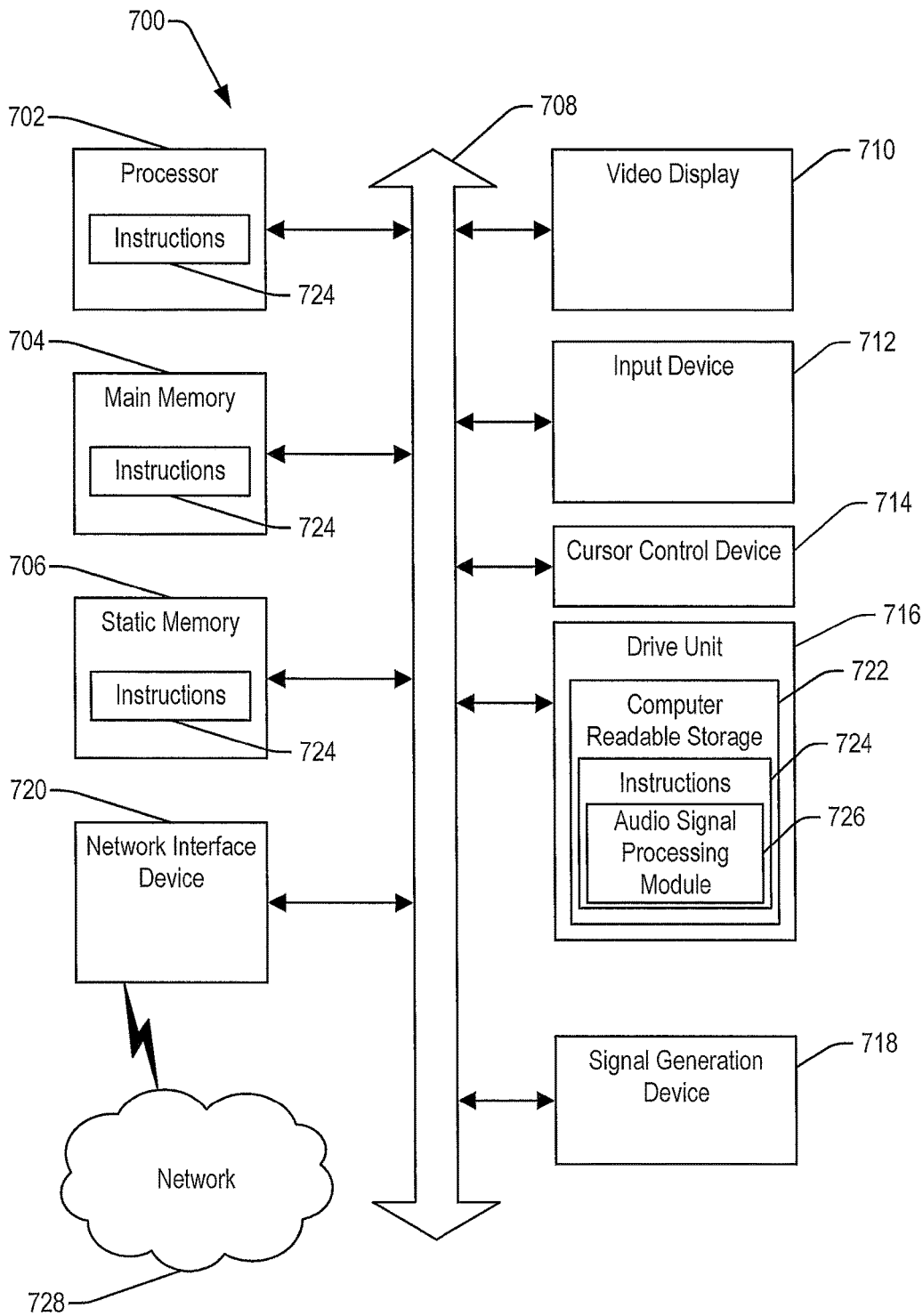
FIG. 7 is a block diagram of an illustrative embodiment of a general computer system.

Referring to FIG. 7, an illustrative embodiment of a general computer system is shown and is designated 700. The computer system 700 includes a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within any one or more of the mobile computing device 102, a computing device at a particular retail location (e.g., a computing device associated with a retail display or the kiosk 302 of FIG. 3), or combinations thereof described with reference to FIGS. 1-3.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. For example, the processor 702 may include or correspond to a processor of the mobile computing device 102 or a processor of a device at a particular retail location. Moreover, the computer system 700 may include a main memory 704 and a static memory 706, which can communicate with each other via a bus 708. For example, the main memory 704 may include or correspond to a memory of the mobile computing device 102 or a memory of a device at a particular retail location. As shown, the computer system 700 may further include a video display unit 710, such as a liquid crystal display (LCD), a light emitting diode (LED) display, a touch screen display, a flat panel display, or a solid state display. Additionally, the computer system 700 may include an input device 712, such as a remote control device or a keyboard, and a cursor control device 714, such as a mouse. In some embodiments, the input device 712 and the cursor control device 714 may be integrated into a single device, such as a capacitive touch screen input device. The computer system 700 may also include a drive unit 716, a signal generation device 718, such as a speaker (e.g., the speakers 104 of FIG. 1-2 or the speaker 304 of FIG. 3), and a network interface device 720. Some computer systems 700 may not include an input device (e.g., a server may not include an input device).

In a particular embodiment, as depicted in FIG. 7, the drive unit 716 may include a computer-readable storage device 722 in which one or more sets of instructions 724, e.g. software, can be embedded. The computer-readable storage device 722 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. A computer-readable storage device is not a signal. Further, the instructions 724 may embody one or more of the methods or logic as described herein. In the embodiment illustrated in FIG. 7, the instructions 724 include an audio signal processing module 726. The instructions 724, including the audio signal processing module 726, may be executable by the processor 702 to perform one or more functions or methods described herein, such as the methods 400, 500, or 600 described with reference to FIG. 4, FIG. 5, or FIG. 6, respectively. In a particular embodiment, the instructions 724 may reside completely, or at least partially, within the main memory 704, the static memory 706, and/or within the processor 702 during execution by the computer system 700. The main memory 704 and the processor 702 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes a computer-readable storage 722 that stores instructions 724, so that a device connected to a network 728 may communicate voice, video or data over the network 728. While the computer-readable storage 722 is shown to be a single device, the computer-readable storage 722 may include a single device or multiple devices, such as a centralized or distributed database, and/or associated caches and servers that store one or more sets of instructions. The computer-readable storage 722 is capable of storing a set of instructions for execution by a processor to cause a computer system to perform any one or more of the methods or operations disclosed herein. For example, the computer-readable storage device 722 may store instructions for execution by a processor to cause a computer system to perform any one or more of the methods 400, 500, or 600 described with reference to FIG. 4, FIG. 5, or FIG. 6, respectively.

In a particular non-limiting, exemplary embodiment, the computer-readable storage 722 may include a solid-state memory such as embedded memory (or a memory card or other package that houses one or more non-volatile read-only memories). Further, the computer-readable storage 722 may be a random access memory or other volatile re-writable memory. Additionally, the computer-readable storage 722 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 700 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving, from a mobile computing device at a kiosk in a retail store, a first audio signal, wherein the first audio signal includes identifiers of items referenced in a shopping list of an application associated with the retail store, wherein the application is executed at the mobile computing device;
    sending, from the kiosk to a server, data based on the identifiers;
    receiving, at the kiosk from the server, item location data, wherein the item location data identifies a particular item of the shopping list and a corresponding location of the particular item in the retail store; and
    sending, from the kiosk to the mobile computing device, a second signal, wherein the second signal includes the item location data.

2. The method of claim 1, further comprising sending an interface to a display device coupled to, or included within, the kiosk responsive to receipt of the item location data, wherein the display indicates the particular item and a location of the particular item in the retail store.

3. The method of claim 1, wherein the server retrieves the item location data from an item database, a location database, or both, based on the data.

4. The method of claim 1, wherein the item location data includes an item identifier and a location identifier for each item in the shopping list that is available at the retail store.

5. The method of claim 1, wherein the kiosk sends the shopping list to the server via a local area network, the internet, or both.

6. The method of claim 1, wherein the first audio signal is modulated in a human inaudible frequency range.

7. The method of claim 1, wherein the second signal is an audio signal that is modulated in a human inaudible frequency range.

8. A retail store kiosk comprising:
    a processor located in a retail store;
    a microphone coupled to the processor, wherein the microphone receives a first audio signal from a mobile communication device, wherein the first audio signal includes identifiers of items referenced in a shopping list of an application associated with the retail store, and wherein the application is executed at the mobile communication device;
    a network interface coupled to the processor, wherein processor causes the network interface to send data to a server via a network and to receive, via the network, item location data responsive to the data sent to the server, wherein the data is based on the first audio signal and wherein the item location data identifies a particular item of the shopping list and a corresponding location of the particular item in the retail store; and
    a speaker, wherein the processor causes the speaker to send the item location data to the mobile communication device as a second audio signal.

9. The retail store kiosk of claim 8, further comprising a display device coupled to the processor, wherein the processor displays the item location data to the display device.

10. The retail store kiosk of claim 8, wherein the data includes an identifier of the retail store.

11. The retail store kiosk of claim 8, wherein the network includes a local area network, the internet, or both.

12. The retail store kiosk of claim 8, wherein the item location data includes an item identifier and a location identifier for each item referenced in the shopping list that is available at the retail store.

13. The retail store kiosk of claim 8, wherein the first audio signal is modulated in a human inaudible frequency range.

14. The retail store kiosk of claim 8, wherein the second audio signal is modulated in a human inaudible frequency range.

15. A method comprising:
sending, from a mobile computing device to a kiosk in a retail store, a first audio signal, wherein the first audio signal includes identifiers of items referenced in a shopping list of an application associated with the retail store, the application executed at the mobile computing device; and
receiving, at the mobile computing device from the kiosk based on the first audio signal, a second signal, wherein the second signal includes item location data, and wherein the item location data identifies a particular item of the shopping list and a corresponding location of the particular item in the retail store.

16. The method of claim 15, further comprising sending to a display device of the mobile computing device an interface that indicates the particular item and a location of the particular item in the retail store.

17. The method of claim 15, further comprising executing the application at the mobile computing device.

18. The method of claim 15, wherein the item location data includes an item identifier and a location identifier for each item in the shopping list that is available at the retail store.

19. The method of claim 15, wherein the first audio signal is modulated in a human inaudible frequency range.

20. The method of claim 15, wherein the second signal is modulated in a human inaudible frequency range.

* * * * *